United States Patent [19]

Oetiker

[11] Patent Number: 5,402,554
[45] Date of Patent: Apr. 4, 1995

[54] CLAMP STRUCTURE WITH SAWTOOTH-LIKE LOCKING ARRANGEMENT

[75] Inventor: Hans Oetiker, Horgen, Switzerland

[73] Assignee: Hans Oetiker AG Maschinen- und Apparatefabrik, Switzerland

[21] Appl. No.: 163,530

[22] Filed: Dec. 9, 1993

[51] Int. Cl.⁶ .......................................... F16L 33/02
[52] U.S. Cl. ................................ 24/20 R; 24/20 TT
[58] Field of Search ............ 24/20 R, 20 TT, 20 EE, 24/20 CW

[56] References Cited

U.S. PATENT DOCUMENTS

| | | | |
|---|---|---|---|
| 973,532 | 10/1910 | McLaughlin | 24/20 TT |
| 1,786,612 | 12/1930 | Heslop | 24/20 TT |
| 2,318,816 | 5/1943 | Tinnerman | 24/20 TT |
| 4,492,004 | 1/1985 | Oetiker | 24/20 R |
| 4,907,319 | 3/1990 | Calmettes et al. | 24/20 R |
| 5,138,746 | 8/1992 | Ojima et al. | 24/20 R |

Primary Examiner—James R. Brittain
Attorney, Agent, or Firm—Paul M. Craig, Jr.

[57] ABSTRACT

A reusable clamp structure in which the clamping band is provided with a tongue-like extension at one end and with a fork-like end portion at the other end which includes a slot-like opening; a form-locking connection of the open ends of the clamping band is achieved by sawtooth-like members extending outwardly along the lateral edges of the tongue-like extensions which are adapted to engage with complementary sawtooth-like members extending inwardly from the longitudinal edges of the opening. To prevent outward escape of the tongue-like extension in its engaged condition, a cover member may be provided over the opening whereby the cover member may be punched out of the clamping band and bent out.

37 Claims, 4 Drawing Sheets

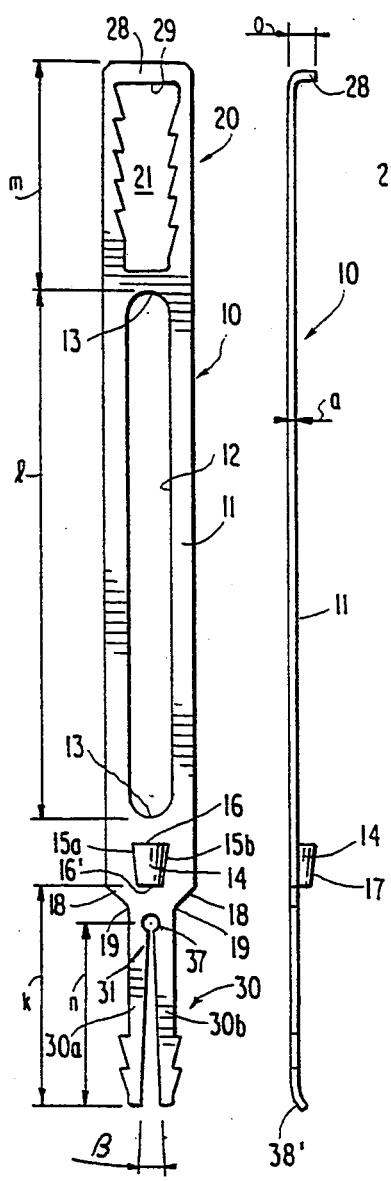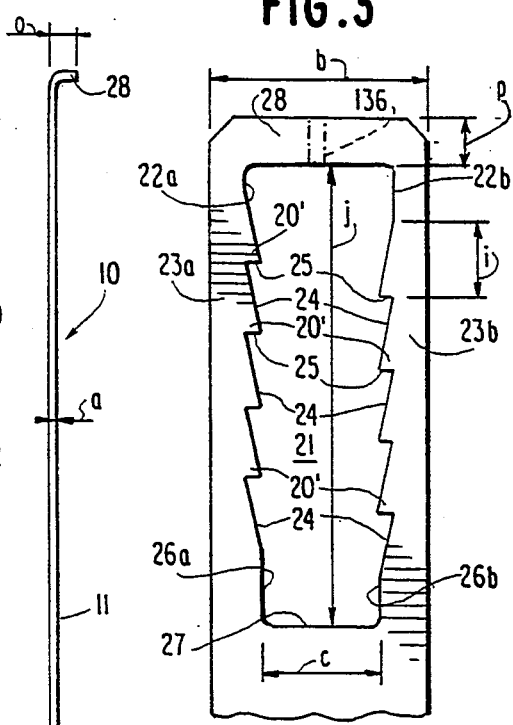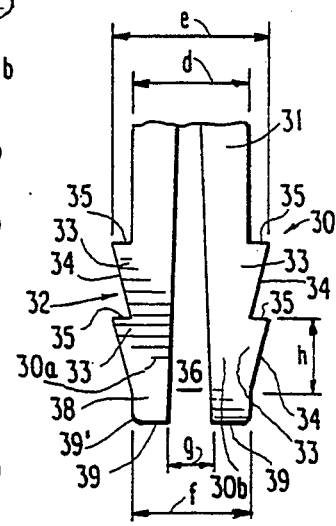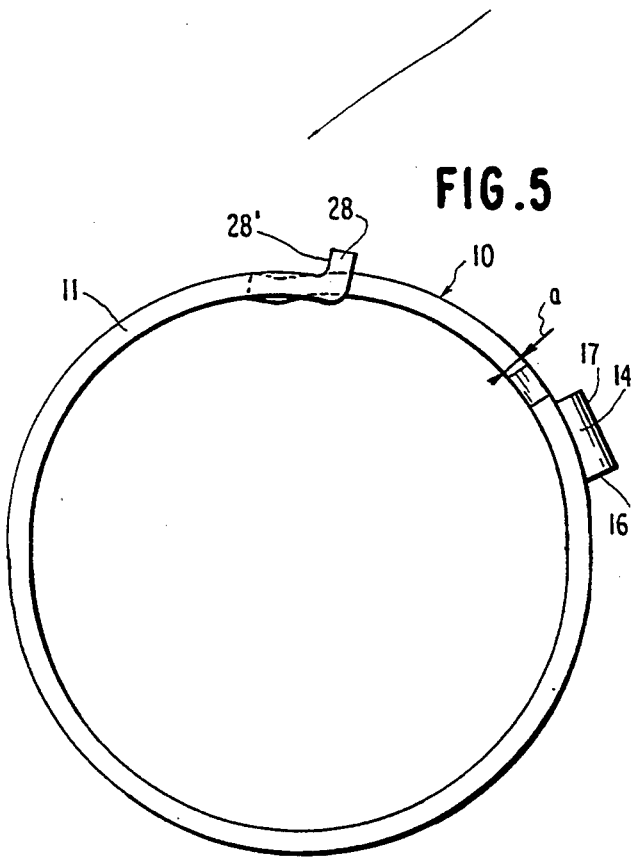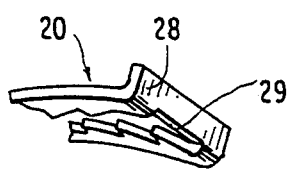

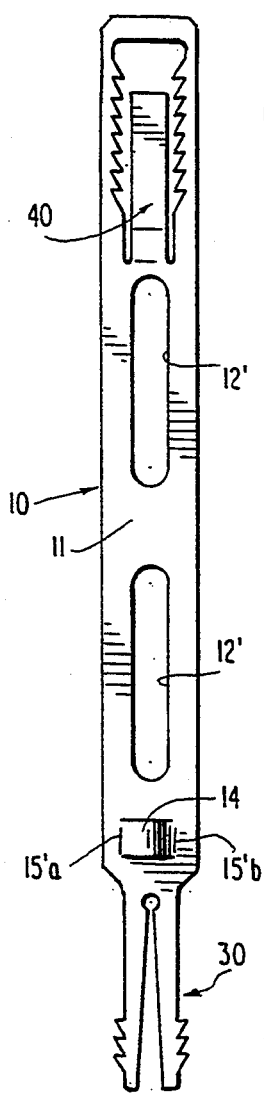
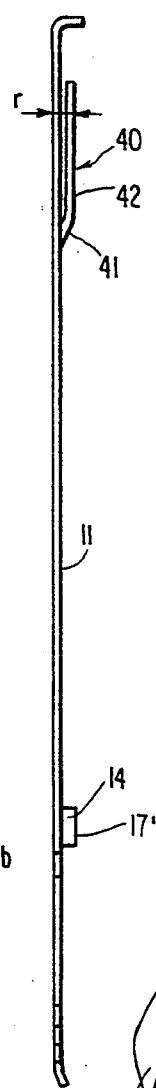
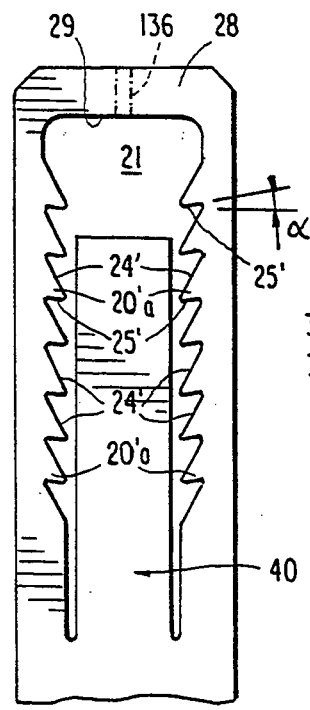
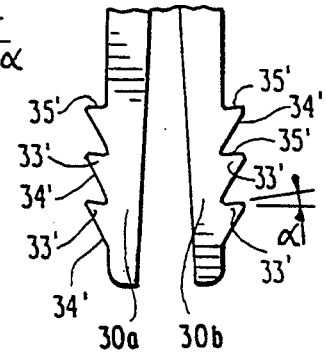
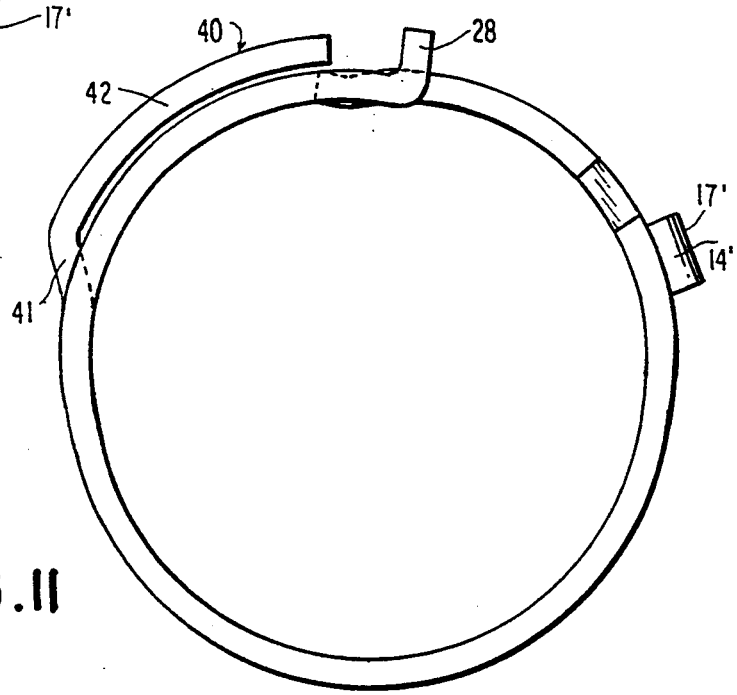

FIG.12
FIG.13
FIG.14
FIG.15
FIG.16
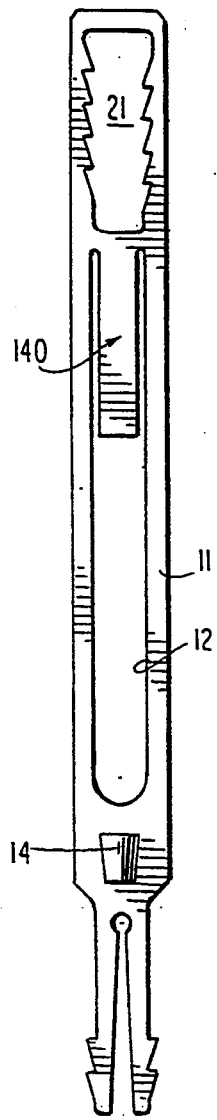
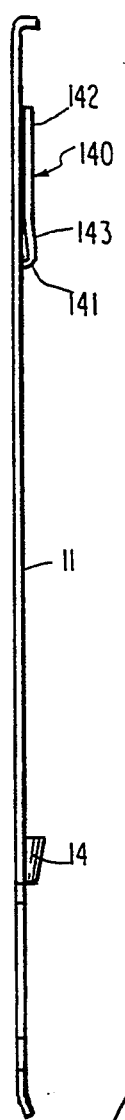
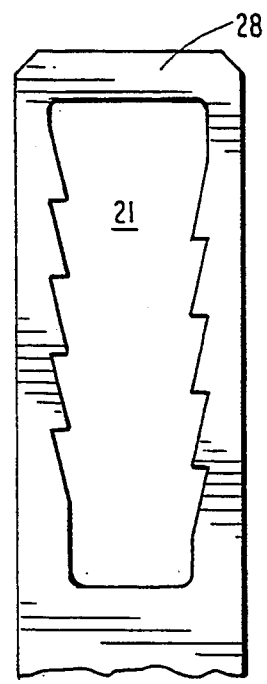
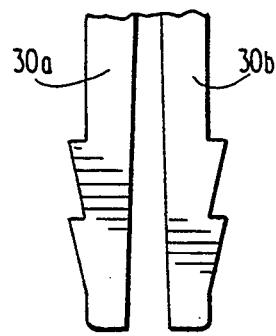
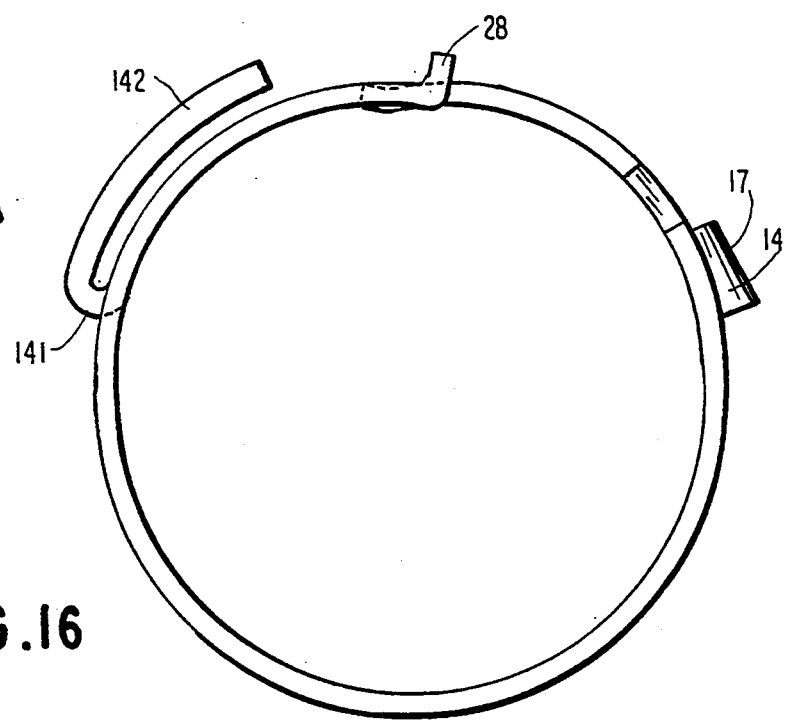

FIG.17 FIG.18 FIG.19 FIG.20
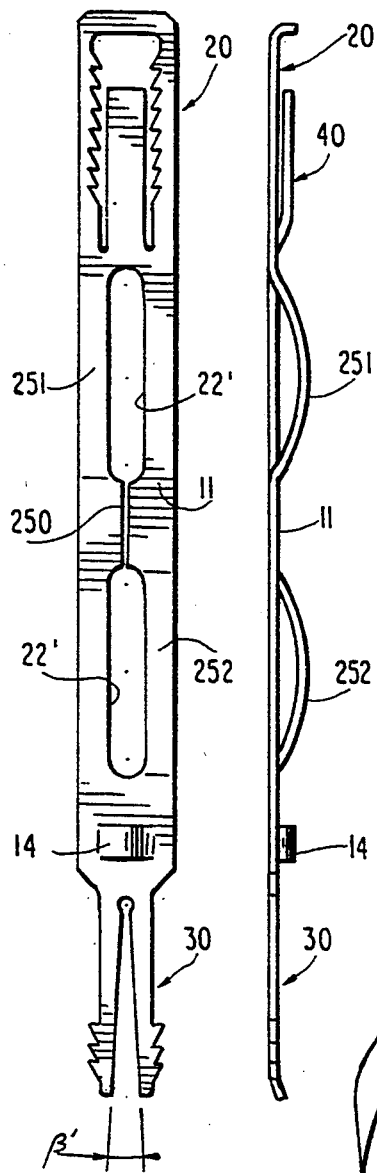
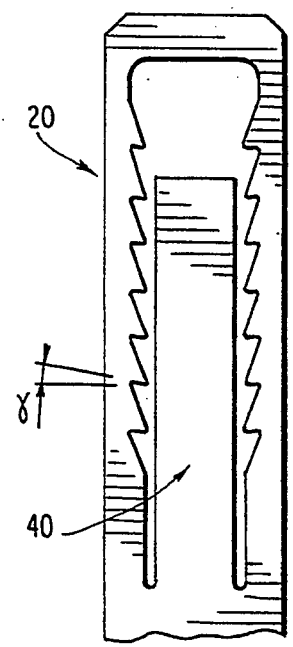
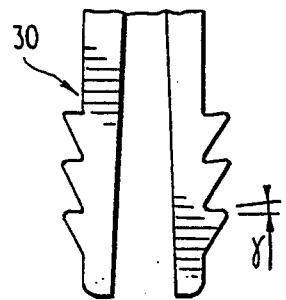
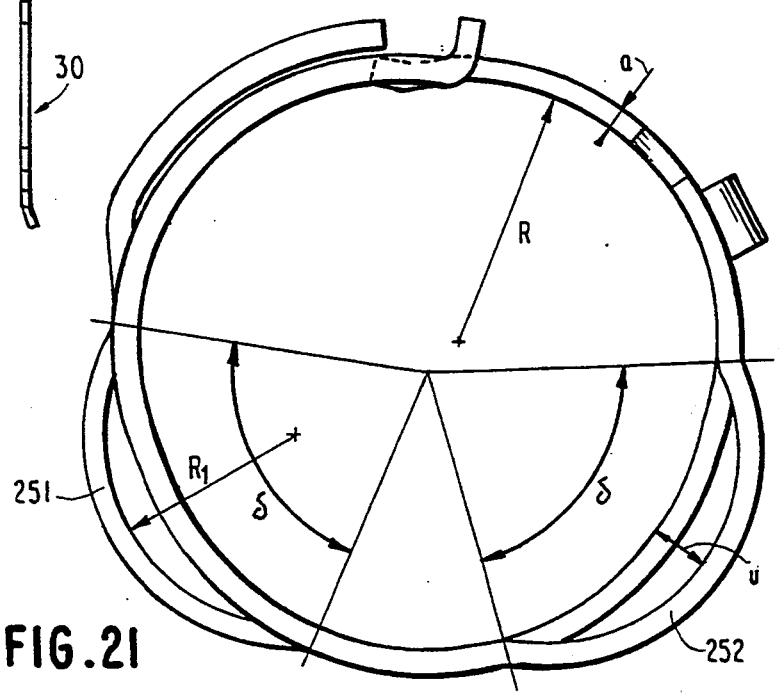
FIG.21

CLAMP STRUCTURE WITH SAWTOOTH-LIKE LOCKING ARRANGEMENT

FIELD OF INVENTION

The present invention relates to a clamp structure with a toothed locking arrangement, and more particularly to a clamp structure with a sawtooth-like locking arrangement which is devoid of any steps, offsets or discontinuities along the internal clamping surfaces to assure a: completely satisfactory fluid-tight seal over 360° of the object to be fastened thereby.

BACKGROUND OF THE INVENTION

Toothed locking arrangements have been used heretofore in connection with various devices for tightening objects. For example, plastic tightening devices used to fasten together cables and cable strands are commercially available which are provided at one band end with vertical teeth projecting outwardly, i.e., perpendicularly with respect to the plane of the band and, at the other end, with a lug having a detent element within the lug adapted to engage with the vertically disposed teeth.

Toothed locking arrangements are also known in connection with hose clamps. For example, the U.S. Pat. No. 2,374,541 discloses radially outwardly extending ratchet teeth with which a spring tongue is adapted to engage. Another clamp provided with outwardly extending teeth is disclosed in U.S. Pat. No. 3,925,851 in which a form-locking connection of the open ends of the clamping band is attained by the external and internal teeth of both band ends engaging in one another. However, as the form-locking connection of this clamp can be released only by lateral deflection of the clamping band, this type of clamp is made from plastic material because such material allows more readily lateral deflection.

In addition to vertically disposed toothed locking arrangements, i.e., with teeth extending outwardly of and more or less perpendicularly to the plane of the clamping band, toothed locking arrangements are also known which are essentially within the plane of the clamping band itself. The U.S. Pat. No. 2,405,912 discloses internal ratchet teeth provided on both sides of a slot that extends longitudinally in one band end while the other band end is provided with a T-shaped stud that is adapted to engage with the oppositely disposed ratchet teeth after passing through an enlarged opening.

Apart from complicated structures involving high manufacturing costs, the prior art patents all entail the disadvantage that they are unable to assure a clamp structure with internal clamping surfaces devoid of steps, offsets or discontinuities to assure a completely satisfactory, fluid-tight clamping action over the entire 360° circumference of the object to be fastened.

My prior U.S. Pat. Nos. 4,299,012 and 4,315,348 disclose so-called "stepless" clamps, i.e., clamps without offsets, steps or discontinuities along the internal clamping surfaces and which are adapted to be tightened by plastic deformation of so-called "Oetiker" ears. These prior art clamps in which the gap underneath the "Oetiker" ear was bridged by the full band width, have proved extraordinarily successful and have been sold by the hundreds of millions. However, the clamp structures disclosed in my aforementioned two U.S. patents are not reusable, i.e., once the plastically deformed ear is deformed, the clamp can only be disassembled by destruction of the ear. So-called stepless earless clamps, which have also enjoyed immense commercial success, are disclosed in my prior U.S. Pat. Nos. 4,492,004 and 4,987,651. Though reusable, these types of clamps are designed normally for only one size of the object (hose) to be fastened and are still relatively complicated in structure.

SUMMARY OF THE INVENTION

Accordingly, it is an object of the present invention to provide a toothed locking arrangement for reusable clamp structures which assures an uninterrupted clamping action along the entire circumference of the interhal clamping surfaces thereof to assure a completely satisfactory fluid-tight assembly of the object to be fastened thereby.

Another object of the present invention resides in a clamp structure having a sawtooth-like locking arrangement which is simple in construction, low cost in manufacture and capable of producing a clamping action devoid of any steps, offsets or discontinuities along the entire circumference of the internal clamping surfaces of the clamp structure.

A further object of the present invention resides in a clamp structure with a toothed locking arrangement which assures good holding ability, yet is reusable, i.e., can be reopened for disassembly and subsequent use again.

A still further object of the present invention resides in a clamp structure with a horizontal toothed locking arrangement which can be tightened and released in a simple manner by the use of commercially available tools.

Still another object of the present invention resides in a clamp structure with a sawtooth-like locking arrangement which can be readily manufactured from metallic clamping band material such as galvanized steel, stainless steel or spring steel and which will assure safe locking of the installed and tightened clamp.

The underlying problems are solved according to the present invention in that the clamp structures of this invention are provided with locking teeth disposed horizontally, i.e., in the plane of the clamping band whereby one end of the clamping band is provided with an externally toothed tongue-like portion adapted to engage in a complementary internally toothed fork-like portion that is closed at its outer end so that during contraction of the clamp structure a form-locking connection is achieved. The tongue-like portion is thereby constructed springy by the provision of a centrally arranged channel to facilitate engagement as also disengagement. However, if the tongue-like portion is not constructed springy, i.e., is made of solid band material, the desired spring characteristics can then be realized by a slotted fork-like portion at the outer end which assumes the spring characteristics necessary for the engagement and release of the toothed arrangement.

According to another feature of the present invention, a cover member is provided along the outside of the fork-like portion which assures against inadvertent disengagement by radial outward escape of the tongue-like portion.

According to still a further feature of the present invention, elastic stretchability in the longitudinal direction of the clamp structure is imparted to the clamping band substantially devoid of such elastic Stretchability by the use of undulations which, for purposes of maintaining the stepless, uninterrupted internal clamping surfaces, are provided along opposite sides of a centrally cut clamping band, mutually displaced in the circumferential direction as disclosed in my prior U.S. Pat. No. 5,230,126. These mutually displaced undulations which impart elastic stretchability to the metal clamping band, devoid of any elastic stretchability in its longitudinal direction, preferably each extend over a relatively large circumferential area subtending an angle of between 60° and 85° with each arch extending outwardly a considerable distance and being formed with a relatively large radius of curvature approaching the radius of the clamp structure itself.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein:

FIG. 1 is a top plan view on a clamp structure in accordance with the present invention;

FIG. 2 is a side elevational view of the clamp structure of FIG. 1;

FIG. 3 is a partial top plan view, on an enlarged scale, of the fork-like end portion of the clamp structure of FIG. 1;

FIG. 4 is a partial top plan view, on an enlarged scale, on the tongue-like portion of the clamp structure of FIG. 1;

FIG. 5 is an axial view on the clamp structure of FIGS. 1 through 4 in the condition placed around an object to be fastened, but not yet tightened;

FIG. 6 is a partial perspective view of the fork-like end portion of the clamp structure of FIGS. 1 through 4;

FIG. 7 is a top plan view, similar to FIG. 1, on a modified embodiment of a clamp structure in accordance with the present invention, which is provided with a cover member externally covering the fork-like end portion;

FIG. 8 is a side elevational view of the clamp structure of FIG. 7;

FIG. 9 is a partial top plan view, on an enlarged scale, similar to FIG. 3, on the fork-like end portion of the clamp structure of FIGS. 7 and 8;

FIG. 10 is a partial top plan view, on an enlarged scale, of the tongue-like end portion of the clamp structure of FIGS. 7 and 8;

FIG. 11 is an axial elevational view on the clamp structure of FIGS. 7 through 10, showing the clamp structure in the condition placed around an object to be fastened, but not yet tightened;

FIG. 12 is a top plan view on a further modified embodiment in accordance with the present invention, which is provided with a cover member for the fork-like end portion bent through 180° after being stamped out of the clamping band;

FIG. 13 is a side elevational view of the clamp structure of FIG. 12;

FIG. 14 is a partial top plan view, on an enlarged scale, on the fork-like end portion of the clamp structure of FIG. 12;

FIG. 15 is a partial top plan view, on an enlarged scale, on the tongue-like end portion on an enlarged scale of the clamp structure of FIG. 12;

FIG. 16 is an axial elevational view of the clamp structure of FIGS. 12 through 15 in the condition placed around the object to be fastened, but not yet tightened;

FIG. 17 is a top plan view on a clamp structure in accordance with the present invention, similar to the clamp structure of FIGS. 7 through 10 but provided with undulations to impart elastic stretchability to the metal clamping band;

FIG. 18 is a side elevational view of the clamp structure of FIG. 17;

FIG. 19 is a partial top plan view, on an enlarged scale, on the fork-like end portion of the clamp structure of FIG. 17;

FIG. 20 is a partial top plan view, on an enlarged scale, on the tongue-like end portion of the clamp structure of FIG. 17; and FIG. 21 is an axial elevational view on the clamp structure of FIG. 17 in the condition placed around the object to be fastened, but not yet tightened.

DETAILED DESCRIPTION OF THE DRAWINGS

Referring now to the drawing wherein like reference numerals are used throughout the various views to designate like parts, it is noted that the fork-like end portions shown in FIGS. 1 and 3, 7 and 9, 12 and 14 and 17 and 19 are shown with the corresponding clamping band end portions flat, i.e., before being bent up to form a fork-like configuration as viewed in end elevational view.

Referring now more specifically to FIGS. 1 through 6, the clamp structure generally designated by reference numeral 10 includes a clamping band 11 made from metallic band material such as galvanized steel, stainless steel or spring steel which in the embodiment of FIGS. 1 through 5 is provided with an elongated opening 12 (FIG. 1) in the center area thereof to facilitate bending around the object to be fastened. The elongated opening 12 terminates in rounded-off end portions 13. One end of the clamp structure is provided with a tongue-like extension generally designated by reference numeral 30 and the other end is provided with a fork-like end portion generally designated by reference numeral 20. An outwardly extending cold-deformed, pressed-out embossment 14, i.e., made by deep-drawing, is tunnel-shaped with longitudinally extending side walls 15a and 15b which are integral with the clamping band to provide a high resistance to longitudinally directed forces applied at the tool-engaging surface 16 for tightening the clamp. In the embodiment of FIGS. 1 through 5, the longitudinal sides 15a and 15b taper in the direction toward the tongue-like extension 30 with the top surface 17 also slanting in the same direction. The full width clamping band 11 narrows to the width of the tongue-like extension 30 by way of tapering transition portions 18 which are rounded-off at 19 by relatively small radii of curvature to enhance the springiness of the tongue portion 30. The fork-like end portion 20 which constitutes the female member of the form-locking arrangement is formed by an opening 21 in this end portion which is provided with internal sawtooth-like teeth 20'. Proceeding in the longitudinal direction of the clamping band from the corresponding end thereof, mutually opposite sides of the opening 21 include a relatively short rectilinear section 22a and 22b which in the embodiment of FIGS. 1 through 5 are of unequal length due to the asymmetric staggered arrangement of the sawtooth-like members formed in the remaining lateral band sections 23a and 23b. Each sawtooth-like member includes an inclined flank surface 24 and a shorter transversely extending flank surface 25. The opening 21 continues in rectilinear sections 26a and 26b and terminates in transversely extending end wall 27. The end section 28, which is shown flat in FIGS. 1 and 3, is bent up in the finished clamp structure as shown in FIGS. 2 and 6 in such a manner that the transversely extending end surface 29 of the slot-like opening 21 is located in the bent-up portion 28 as shown in FIG. 6. The opening in the bent-up section 28 defined by end surface 29 has a depth corresponding essentially to the thickness of the clamping band 11.

The tongue-like extension 30, which forms the male member of the form-locking arrangement of this invention, includes a first, externally substantially rectilinear section of a reduced width d (FIG. 4) and formed by the two lateral portions 30a and 30b which is adjoined by a second section generally designated by reference numeral 32 forming a number of sawtooth-like locking members 33, each defined by an inclined flank surface 34 and by a transversely extending shorter flank surface 35. The flank surfaces 34 are thereby inclined so as to taper toward the free end of the tongue-like extension 30. The sawtooth-like members 33 of the tongue-like extension 30 are thereby symmetrically arranged and of complementary shape to the internal sawtooth-like members 20' in the fork-like end portion 20. However, in the embodiment of FIGS. 1–5, the internal sawtooth-like members 20' are asymmetrically arranged, mutually offset on opposite sides by half the pitch which permits a finer adjustability but reduces the holding ability of the clamp as a locking engagement exists in the tightened condition only on one side of the locking arrangement. The tongue-like extension 30 terminates in a rectilinear end section 38 slightly bent up at 38' (FIG. 2). The tongue-like portion 30 is provided with a longitudinally extending channel 36 tapering from its maximum width at the free end of the tongue-like portion in the direction toward the embossment 14 and terminating in a small circle 37 so as to impart elasticity to the two halves 30a and 30b for purposes of facilitating engagement of the sawtooth-like locking arrangement and also subsequent disengagement of the reusable clamp structure of thins invention. The transversely extending end surfaces 39 of the two halves 30a and 30b pass over into the side surfaces of the portions 38 by way of rounded-off transition portions 39' of relatively small radius.

The clamp structure in accordance with the present invention is thus provided with a sawtooth-like locking arrangement in which the band end portions provided with the complementary, mutually engaging saw-tooth-like members 33 and 20' are disposed horizontally, i.e., in the plane of the clamping band, whereby the external and internal sawtooth-like members provided on the tongue-like extension and in the opening of the opposite end portion are adapted to engage with one another as the clamp structure is tightened by engagement with a commercially available tool, such as a pincer-like tool, at the tool-engaging surface 16 of the embossment 14 and at the tool-engaging surface 28' of the bent-up end portion 28 (FIG. 5) which causes the springy tongue-like extension 30 which is held down by the end surface 29 of the opening 21 to slide longitudinally within opening 21 until reaching the tightened position. This sliding movement of the tongue-like extension 30 is made possible by the springiness of the two halves 30a and 30b as the sawtooth-like members 33 pass over the complementary sawtooth-like members 20' which requires the two halves 30a and 30b to approach one another from time to time. The springiness of the two halves, realized by the tapering channel 36 is effectively assisted by the small circular hole 37 at the inner end of the channel 36. The end face of the fork-like end portion 20 is actually closed by the outwardly displaced end section 28 though it appears as an open fork-like element in end view. A form-locking connection is attained during contraction of the clamp structure as a male sawtooth-like member 33 engages with the corresponding sawtooth-like female member 20'.

In a typical example of a clamp structure embodying the present invention which, however, is non-limitative of the present invention and which may be varied in its dimensions as known to those skilled in the art, the clamping band 11 has a width b of about 10 mm. and a thickness a of about 1.2 mm. The minimum width c of the opening 21 is about 5.6 mm. or slightly greater (+0.02 mm.), while the width d of the rectilinear portion 31 of the tongue-like extension 30 is about 5.4 mm. The maximum external width dimension e of the sawtooth-like members 33 of the tongue-like extension is about 7 mm. or slightly less (−0.02 mm.), while the dimension f of the rectilinear end portions 38 is about 5.6 mm. or slightly less (−0.02 mm.). The angle $\beta$ of the tapering channel 36 (FIG. 1) is about 4° while the maximum opening distance g is about 2.1 mm. The pitch h (length) of each sawtooth-like member 33 is about 3.2 mm., while the pitch i (length) of each sawtooth-like member 20' in the opening 21 is also about 3.2 mm. so as to be complementary to the pitch h of the external sawtooth-like members 33 of the tongue-like extension 30. The overall length of the clamp is about 116 mm. while the length 1 of the opening 12 is about 60 mm. The length j of the opening 21 is about 20.5 mm. while the distance m from the end of the fork-like end portion 20 to the adjacent end 13 of the opening 12 is about 24.5 mm. The distance k from the end surface 16' of embossment 14 to the end surface 39 is about 24 mm. while the distance n from the center of the small opening 37 to the end surface 39 is about 20 mm. The length of the tongue-like extension 30 from the beginning of the transition portion 18 at the point of full band width is about 20 mm. The distance e from the bottom surface of the clamping band 11 to the end of the bent-up section 28 is about 3.2 mm. while the dimension p of the end portion is about 2 mm. (FIG. 3). The small radii in rounded-off transition portions 19 as also the radius of curvature for the bent-up section 28 are of the order of 0.5 mm. The height of the tunnel-shaped embossment may be the same as dimension o. It is understood that the dimensions given above are merely for illustrative purposes, but may be varied according to size and use of the clamp. Important to the present invention, which seeks to obtain a clamp structure devoid of any offset, step or discontinuity along its internal clamping surfaces, are the construction of complementary sawtooth-like members in opposite end areas of the clamp structure which extend externally and internally from the opposite end areas to slidingly engage with one another.

Disengagement of the form-locking arrangement of the clamp structure of FIGS. 1–6 can be readily effected in that the same pincer-like tool is applied near the root of the springy tongue-like extension 30 until its sawtooth-like teeth 33 disengage from the complementary sawtooth-like area of the fork-like end portion 20 whereby the form-locking connection is again released.

The embodiment of FIGS. 7 through 11 differs from the embodiment of FIGS. 1 through 6 in that two substantially symmetrically arranged openings 12' are provided in the clamping band 11, the sawtooth-like members 33' on the tongue-like extension 30 and the sawtooth-like members 20'a in the opening 21 are symmetrically arranged, and a cover member generally designated by reference numeral 40 is provided externally of the opening 21 to prevent any outward escape of the tongue-like extension 30. In the embodiment of FIGS. 7 through 11, the cover member 40 is rectangular and after being punched out of the clamping band from within the area forming the opening 21 is bent out so as to include an outwardly extending short section 41 adjoined by the main cover section 42 (FIGS. 8 and 11). Also differing from the embodiment of FIGS. 1 through 6, the flank portions 25' and 35' of the sawtooth-like members 20'a and 33' do not extend transversely at right angle to the longitudinal direction of the clamping band as in FIGS. 1-6, but now subtend an angle $\alpha$ of about 7° with respect to the transverse direction perpendicular to the clamping band longitudinal direction. The pitch of the sawtooth-like members, now arranged symmetrically on both sides of the two halves 30a, 30b, respectively, of the opening 21, is shortened, for example, to about 2 mm. The inclination of the flank portions 24' with respect to the longitudinal direction of the clamping band may be, for example, about 26° and the inclination of the flank portions 34' with respect to the longitudinal direction Of the clamping band may be slightly larger, for example, about 27°. The sawtooth-like members 33' and 20'a are rounded off externally and internally by a small radius of curvature of about 0.15 mm. The distance r from the outer surface of the cover member 40 to the bottom surface of the clamping band 11 may be about 2.9 mm. while the cover member 40 may be about 17.5 mm. long (before being bent out) and about 4.5 mm wide. The inclination of the flank portions 25' and 35', i.e., the angle $\alpha$ affects the holding ability of the form-locking connection which improves as the angle $\alpha$ is increased. However, with an angle $\alpha$ greater than 7°, it becomes theoretically no longer possible to disassemble the clamp which would be desirable for non-reusable clamps. On the other hand, even though the angle $\alpha$ may be greater than 7°, disassembly of the clamp would still be possible with the use of a special tool which closes and forwardly displaces the tongue-like extension halves 30a and 30b substantially simultaneously.

Also differing in this embodiment, the angle $\beta$ is increased to about 5°, the length of each opening 12' is about 24 mm., the embossment 14' has straight lateral walls 15'a an 15'b as well as a straight top surface 17'. As to the rest, what was said with respect to the embodiment of FIGS. 1-6 applies analogously to the embodiment of FIGS. 7-11.

The embodiment of FIGS. 12 through 16 differs from the embodiments described so far in that the cover member generally designated by reference numeral 140 is formed by a part of the clamping band 11 from within the area of the opening 12 and is then bent back upon itself at 141 (FIG. 13) to pass over into the main cover portion 142 by way of an inwardly sloping portion 143. As can be seen in FIG. 16, the inwardly sloping portion 143 disappears when the clamp is bent into circular shape. As to the rest, the clamp structure of this embodiment is similar to that of FIGS. 1 through 6.

The embodiment of FIGS. 17 through 21 differs from the embodiment of FIGS. 7 through 11 in that the clamp structure also provides compensation for tolerances and temperature or pressure fluctuations notwithstanding the fact that a steel clamping band is substantially devoid of elastic stretchability in the longitudinal direction. For that purpose, the clamping band 11 is cut centrally at 250 (FIG. 17) intermediate the two openings 22' and is provided with an undulation 251 and 252 on opposite sides of the cut 250, each of which subtends a relatively large angle $\delta$ of the order of about 60° to 85°, preferably about 70°. The maximum distance u of outward displacement from the outer surface of the clamping band to the outer surface of the undulation 251 or 252 approaches three times the thickness of the clamping band, e.g. may be, at least, about 3 mm. The radius of curvature $R_1$ of each undulation approaches the radius R of the clamp structure, i.e., is preferably at least two-thirds of the latter radius. In the embodiment of FIGS. 17 through 21, the radius R is about 15 mm. and the radius $R_1$ is about 11 mm. while the distance u is about 3.2 mm. By mutually displacing the undulations 251 and 252, and providing them only on opposite sides of the cut 250, the internal clamping surface devoid of any step, offset or discontinuity is preserved which assure a fluid-tight connections over 360° of the object to be fastened.

In all of the embodiments, the clamp, once placed about the object to be fastened, can be tightened with the use of a tool such as a typical pincer-like tool or any other known tool. By simultaneously engaging the bent-up portion 28 at the tool-engaging surface 28' and the embossment 14 at the tool-engaging surface 16, the clamp can be contracted until it is seated firmly on the object to be fastened at which time the sawtooth-like members 33' of the tongue-like extension have engaged in the appropriate sawtooth-like members 20', 20'a in the fork-like end portion. The clamp can also be disengaged, i.e., reopened, with the same tool in that one applies the tool at the root of the springy tongue-like portion 30 in a plane transverse to the plane of the clamping band so as to compress the two halves 30a and 30b until the teeth thereof are disengaged from the sawtooth-like members of the fork-shaped end portion and the form-locking connection can be disengaged thereby. However, reopening can also be achieved with the same tool in that one applies the pincer-like tool at the 90° bent end portion 28 of the fork-like end and tilts it in the direction toward the cover member. Moreover, the clamp structures of this invention also lend themselves readily to preassembly by merely causing a form-locking engagement of the sawtooth-like members in their position corresponding to maximum diameter of the clamp structures.

With the use of appropriate material, the clamp structure in accordance with the present invention can also be used in applications in which round rings are used at present, as disclosed in my prior U.S. Pat. No. 5,001,816, in which the rings are reduced in diametric dimension by a so-called shrinking process to achieve the clamping action required, for example, at an axle boot for CV joints in the automotive industry. The clamp structures of this invention, by their particular construction also lend themselves to a tightening procedure analogous to the shrinking method.

While I have shown and described several embodiments in accordance with the present invention, it is understood that the same is not limited thereto but is susceptible of numerous changes and modifications as known to those skilled in the art. The selection of the particular sawtooth-like configuration in the fork-like end portion and in the tongue-like extension can be chosen at will between the symmetric arrangement and the asymmetric arrangement depending on the required holding strength and the fineness of adjustability in a given application. Moreover, the number of sawtooth-like members can be varied though for adjustability it is preferable to have more sawtooth-like members in the opening 21 than along the tongue-like portion. Furthermore, in lieu of a springy tongue-like extension 30, it is also possible to use a solid tongue-like extension and in that case to impart spring-like characteristics to the fork-like end portion 20 by providing mutually opposite slots 136 in the center of the fork-like end portion 28, indicated in dash and dotted lines in FIGS. 3 and 9, in which case the channel 36 may be omitted in the tongue-like extension. Also, both end portions 20 and 30 may be constructed so as to have some springiness if-it is desired with the particular material used for the clamp structure of this invention.

The clamp structure according to the present invention can be made from stainless steel, hardenable spring band steel, galvanized steel or also of plastic material, depending on the material of the object to be fastened which may be, for example, rubber, neoprene, silicone, thermoplastic material (Hytrell) and other plastic materials.

I therefore do not wish to be limited to the details shown and described herein but intend to cover all such changes and modifications as are encompassed by the scope of the appended claims.

I claim:

1. A clamp structure, comprising clamping band means made from band material of substantially constant thickness, tightening means in the clamping band means for tightening the clamping band means about an object to be fastened thereby, and further means for holding the clamping band means in its tightened condition, said further means including a tongue-like extension at one end of the clamping band means, opening means near the other end of the clamping band means, and complementary sawtooth-like means along the longitudinal edge surfaces of said tongue-like extension and along the inner longitudinal surfaces of said opening means, said tongue-like extension being provided with means to cause elastic engagement of its sawtooth-like means with the sawtooth-like means of the opening means.

2. A clamp structure according to claim 1, wherein said sawtooth-like means extend externally along said tongue-like extension substantially transversely of the longitudinal direction of said clamping band means but substantially in the plane thereof, and wherein said sawtooth-like means extend along the inner longitudinal surface of said opening means substantially transversely of said longitudinal direction of the clamping band means but substantially in the plane thereof.

3. A clamp structure according to claim 2, wherein each sawtooth-like means of the tongue-like extension includes a first inclined flank portion inclined in the direction toward the free end of the tongue-like extension and a second flank portion extending generally transversely to the longitudinal direction.

4. A clamp structure according to claim 3, wherein the angle of said second flank portion is substantially 90° with respect to the longitudinal direction.

5. A clamp structure according to claim 3, wherein said angle differs from a right angle by no more than about 10°.

6. A clamp structure according to claim 1, wherein said means in said tongue-like extension to cause elastic engagement includes a channel in the center area of the tongue-like extension leaving on both sides thereof tongue-like half-portions adapted to be elastically displaced toward one another.

7. A clamp structure according to claim 6, wherein said channel has its maximum width in the area of the free end of the tongue-like extension and tapers in a direction away from said free end.

8. A clamp structure according to claim 7, wherein the end of said channel opposite the free end of the tongue-like extension terminates in a small substantially circular opening.

9. A clamp structure according to claim 8, wherein the diameter of said small substantially circular opening is larger than the minimum dimension of said channel in the transverse direction of the clamping band means.

10. A clamp structure according to claim 1, wherein said tightening means includes, on the one hand, a cold-deformed embossment means pressed-out by deep-drawing and forming a longitudinally extending tunnel-like Structure whose sides are integral with the clamping band means and, on the other, a bent-up end portion at the other end of the clamping band means.

11. A clamp structure according to claim 10, wherein said bent-up portion includes a short section of said opening means.

12. A clamp structure according to claim 11, wherein said short section of said opening means in said bent-up end portion has a depth corresponding substantially to the thickness of said clamping band means.

13. A clamp structure according to claim 10, wherein said embossment means is located in the clamping band means near the beginning of said tongue-like extension.

14. A clamp structure according to claim 1, further comprising cover means externally covering said opening means to prevent inadvertent external escape of said tongue-like extension.

15. A clamp structure according to claim 14, wherein said cover means is formed by a bent-out part of the clamping band means cut-out from the area of said opening means between mutually opposite sawtooth-like engaging means.

16. A clamp structure according to claim 15, wherein said bent-out part is substantially rectangular whose width is less than the minimum spacing between corresponding mutually opposite sawtooth-like means.

17. A clamp structure according to claim 14, wherein at least one opening is provided between the ends of the clamping band means, and wherein said cover means is formed by at least a part of the clamping band means punched out from within the area of said opening and bent back upon itself through about 180° to cover said opening means.

18. A clamp structure according to claim 1, further comprising means for imparting elastic stretchability to the clamping band means in its longitudinal direction including outwardly extending undulation means within the area of the clamping band means intermediate the tightening means.

19. A clamp structure according to claim 18, wherein said clamping band means is provided with a cut substantially in the center thereof and said undulation means are disposed on opposite sides of the cut mutually displaced from one another in the clamp longitudinal direction to maintain an uninterrupted clamping action along the inner clamping surfaces of said clamp structure over 360° thereof.

20. A clamp structure according to claim 19, wherein each of said undulation means subtends an angle of about 55° to about 85°.

21. A clamp structure according to claim 20, wherein said angle is of the order of 70°.

22. A clamp structure according to claim 19, wherein the maximum outward displacement of a respective undulation means is at least about two and one-half times the thickness of the clamping band means.

23. A clamp structure according to claim 22, wherein said maximum outward displacement is at least three times the thickness of the clamping band means.

24. A clamp structure according to claim 1, wherein the clamp structure is made in one piece from said band material.

25. A claim structure according to claim 24, wherein said band material is a metallic band material consisting of galvanized steel, stainless steel and spring steel.

26. A clamp structure according to claim 1, wherein said complementary sawtooth-like means which engage with one another are disposed in substantially the same plane.

27. A reusable clamp structure, devoid of any discontinuity, step or offset along its internal clamping surface to assure a fluid-tight connection of the object to be fastened thereby over the entire circumference thereof, comprising clamping band means made from band material of substantially constant thickness, tightening means in the clamping band means for tightening the clamping band means about an object to be fastened thereby, and further means for holding the clamping band means in its tightened condition, said further means including a tongue-like extension at one end of the clamping band means and a fork-like end portion at the other end thereof provided with an opening means, complementary sawtooth-like means extending outwardly along the longitudinal edge surfaces of said tongue-like extension and extending internally along the inner longitudinal surfaces of said opening means, and said complementary sawtooth-like means being disposed substantially within the plane of the clamping band means, and said fork-like end portion including a bent-up end section having a part of said opening means.

28. A clamp structure according to claim 27, further comprising means imparting elasticity to one of said tongue-like extension and said fork-like end portion in a plane substantially transverse to the plane of the clamping band means.

29. A clamp structure according to claim 28, where said means for imparting elasticity to said tongue-like extension includes a channel in the center area of the tongue-like extension leaving on both sides thereof tongue-like portions adapted to be elastically displaced toward one another.

30. A clamp, structure according to claim 29, wherein said means for imparting elasticity to said fork-like extension includes a cut in the transverse end section of said fork-like end portion extending from the free end of said fork-like end portion into said opening means.

31. A clamp structure according to claim 30, wherein said cut is located substantially in the center of said end section and forms a gap extending substantially in the longitudinal direction of the clamping band means.

32. A clamp structure according to claim 28, further comprising cover means externally covering said opening means to prevent inadvertent external escape of said tongue-like extension, said cover means being formed by a bent-out part punched out of the clamping band means.

33. A clamp structure according to claim 32, further comprising means for imparting elastic stretchability to the clamping band means in its longitudinal direction including outwardly extending undulation means within the area of the clamping band means intermediate the tightening means, said clamping band means being provided with a cut substantially in the center thereof and said undulation means being disposed on opposite sides of the cut and mutually displaced in the circumferential direction to maintain an uninterrupted clamping action along the inner clamping surfaces of said clamp structure.

34. A clamp structure according to claim 33, wherein each of said undulation means subtends an angle of about 55° to about 80°, and wherein the maximum outward displacement of a respective undulation means is at least about two and one-half times the thickness of the clamping band means.

35. A clamp structure according to claim 33, wherein said tightening means includes, on the one hand, a cold-deformed embossment means pressed-out of the clamping band means by deep-drawing and forming a longitudinally extending tunnel-like structure whose sides are integral with the clamping band means, and, on the other, a bent-up end section of the fork-like end portion of the clamping band means.

36. A clamp structure according to claim 27, further comprising cover means externally covering said opening means to prevent inadvertent external escape of said tongue-like extension.

37. A clamp structure according to claim 27, further comprising means for imparting elastic stretchability to the clamping band means in its longitudinal direction including outwardly extending undulation means within the area of the clamping band means intermediate the tightening means, said clamping band means being provided with a cut substantially in the center thereof and said undulation means being disposed on opposite sides of the cut and mutually displaced in the circumferential direction to maintain an uninterrupted clamping action along the inner clamping surfaces of said clamp structure.

* * * * *